Figure 1:
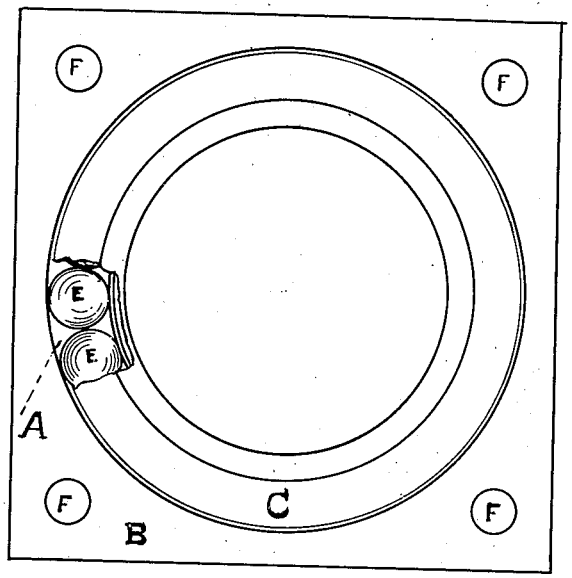

O. C. KNIPE.
BALL BEARING.
APPLICATION FILED DEC. 20, 1909.

998,099.

Patented July 18, 1911.

WITNESSES:
John A. Davidson
Alfred S. Lewis

Oliver C. Knipe INVENTOR.

UNITED STATES PATENT OFFICE.

OLIVER C. KNIPE, OF PALO ALTO, CALIFORNIA.

BALL-BEARING.

998,099.

Specification of Letters Patent. Patented July 18, 1911.

Application filed December 20, 1909. Serial No. 534,207.

*To all whom it may concern:*

Be it known that I, OLIVER C. KNIPE, a citizen of the United States, residing at Palo Alto, in the State of California, county of Santa Clara, have invented certain new and useful Improvements in Ball-Bearings, of which the following is a specification.

This invention relates to that class of ball retaining bearings in which the balls are retained in the annular cup or raceway when the shaft is removed from the bearing. This is usually accomplished by having a cup or raceway for the balls, an inner flanged shell or cone to fit on the shaft, and a third member attached to the cone or cup and of such design that it will allow independent rotation of the cup and cone but prevent displacement of the balls. The defect in all of these devices is that they are liable to accidental displacement making them not only unreliable but objectionable where assembling and repairing must be done by unskilled workmen. Applicant's device differs from these by supplying a complete bearing in which the third member is dispensed with entirely when the bearing is completed; it also contains other novel features not heretofore disclosed in ball bearings, and which are fully brought forth in the description and claims.

It provides an annular cup in which the balls rotate and an inner sleeve having outwardly flanged ends and of such relative diameter that the cylindrical portion passes through the center opening in the ball cup but the flange diameters are made larger than the opening in the ball cup. The sleeve is made of sufficient length to admit of rotation without binding on the cup when the bearing is completed; thus it will be seen that it is impossible after the bearing is assembled to remove either balls or sleeve from the cup.

The cup and cone are preferably formed of sheet steel and then casehardened; the cone or sleeve being stamped in two cylindrical pieces each having one end conically flanged outwardly and the cylindrical ends beveled off about one half of their sectional end areas. The balls are placed in the cup, one part of the sleeve or cone is placed in the cup and the small end of the second part of the sleeve or cone is brought in contact with the small end of the first part and local heat is applied (by means of an electric current or some form of autogenous gas flame) at the abutted edges, instantly welding the two parts together without injury to the casehardened surfaces of the body of the sleeve.

The reduced cross-sectional area of the abutting edges of the parts of the sleeve or cone causes them to heat rapidly and the edges fuse before the heat carries back to the body of the sleeve sufficiently to injure the case hardening; when heated to the fusing point a slight pressure on the parts unites the same firmly.

This construction forms a strong durable bearing that can be made at low cost, rapidly, and produces a product superior to any now on the market.

The cup is preferably made with an outwardly projecting flange B having a plurality of holes F in its margin, through which retaining bolts or screws may be inserted.

A plurality of holes made in the rim serve for the insertion of anchoring bolts or screws. The flange also serves to support the bearing where it is desired to aline a shaft in position and run melted Babbitt or similar melted metal around the bearing while temporarily so held the perforations in the rim thus also help to hold the bearing in alinement by the flow of the metal filling them up.

Figure 2:
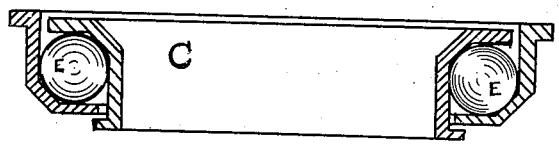
Figure 3:
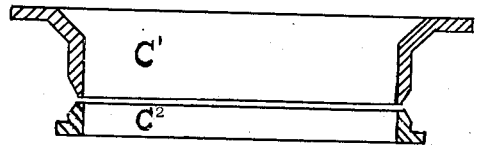

In the drawings Figure 1. is a top view of the bearing complete with a portion of the sleeve or cone broken away. Fig. 2. is a vertical section through Fig. 1. Fig. 3. is a vertical section through the sleeve or cone showing the two parts $c'$ and $c^2$ prepared for welding.

The cup "A" with its perforations "E" and the two parts of the sleeve or cone $c'$ and $c^2$ are rapidly produced in a drawing or stamping press complete ready for case hardening. The parts are assembled and held in position between the clamps of a welding machine such as the Thomson electric welder. The beveled edges of the parts of the cone held in contact by the clamps instantly fuse when the electric current is turned on, and a slight pressure on the adjustable clamps completes the weld before the heat travels back far enough to injure the case hardened surfaces of the body of the sleeve or cone. The parts of the cone are made of sufficient length to admit of free rotation after welding; the balls "E" being held between the cone and its welded retainer, and the hardened cup.

What I claim and desire to secure by Letters Patent of the United States is.

1. A ball bearing comprising a hard steel cup, a hard steel cone, balls interposed therebetween, and an abutment on the cone overlapping the end of the cup and molecularly integral with the cone to which it is united by a zone of soft steel.

2. A ball bearing comprising a hard steel cup, a hard steel cone, balls interposed therebetween, and an abutment on the cone overlapping the end of the cup and molecularly integral with the cone at a weld and to which it is united by a zone of soft steel.

In testimony whereof I have hereunto subscribed my name this 10th day of December 1909.

OLIVER C. KNIPE.

Witnesses:
FRANK P. SINGER,
SAMSON McDOWELL.